United States Patent [19]

Kreske, Jr.

[11] 4,100,970
[45] Jul. 18, 1978

[54] PANEL FORMED OF HOLLOW PLASTIC BALLS CONTAINING A FIRE RETARDANT LIQUID

[76] Inventor: Alvin Kreske, Jr., Rte. 5, Box 407, Valparaiso, Ind. 46383

[21] Appl. No.: 512,847

[22] Filed: Oct. 7, 1974

[51] Int. Cl.$^2$ .......................... A62C 35/10; E04B 1/92
[52] U.S. Cl. .......................... 169/57; 52/168; 169/26; 428/402; 428/921
[58] Field of Search .............. 169/26, 54, 57; 428/323, 402, 921; 52/168

[56] References Cited

U.S. PATENT DOCUMENTS

| | | | |
|---|---|---|---|
| 1,961,567 | 6/1934 | Nelson | 169/26 |
| 2,917,116 | 12/1959 | Wyant | 169/26 X |
| 3,104,060 | 9/1963 | Bricmont | 52/168 X |
| 3,440,130 | 4/1969 | Telkes | 428/402 X |
| 3,616,162 | 10/1971 | Noziere | 428/921 X |
| 3,773,475 | 11/1973 | Madden, Jr. | 52/168 X |

FOREIGN PATENT DOCUMENTS 934,947  8/1963  United Kingdom .................. 169/26

Primary Examiner—Bruce H. Stoner, Jr.
Assistant Examiner—Andres Kashnikow
Attorney, Agent, or Firm—Burmeister, York, Palmatier, Hamby & Jones

[57] ABSTRACT

Panels and other objects are formed by blowing hollow bubbles of plastic into a mold and stacking the bubbles in the mold in abutment with each other while the bubbles are tacky to form a mass of bubbles bonded together in a desired contour. The bubbles are formed by blowing successive bursts of compressed air into a mass of plastic material confronting an orifice and cutting the bubble off from the mass of plastic material on the side of the orifice opposite the liquid plastic. A panel for construction purposes is illustrated and includes fire extinguishing means integral with the panel.

6 Claims, 13 Drawing Figures

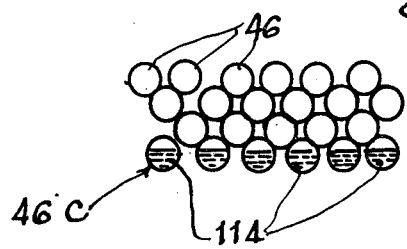
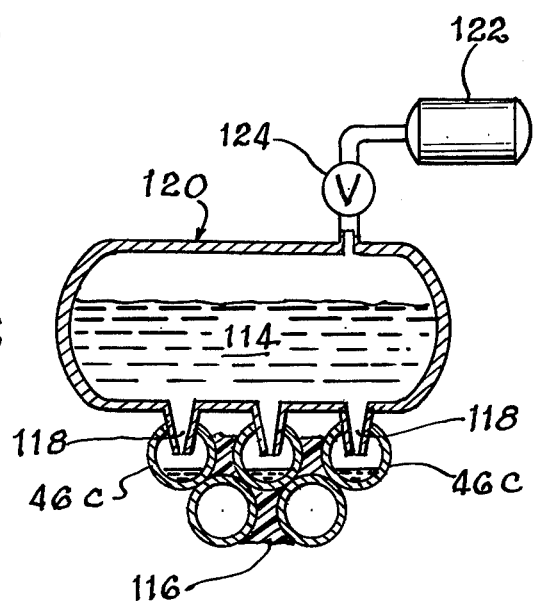
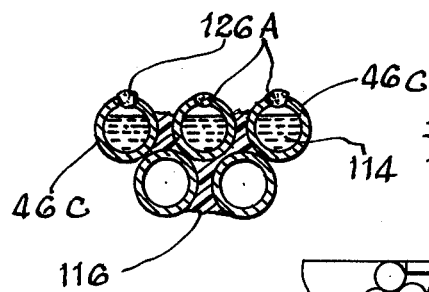
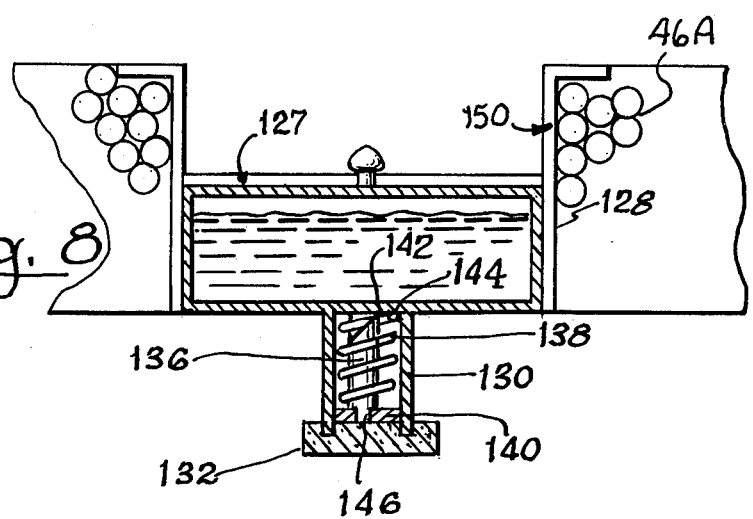

PANEL FORMED OF HOLLOW PLASTIC BALLS CONTAINING A FIRE RETARDANT LIQUID

INTRODUCTION

The present invention relates to processes and apparatuses for molding or forming plastic bodies, and to a panel formed by use of the process of this invention. In addition, the present invention relates to devices for retarding or extinguishing fire in structures.

The principle object of the present invention is to provide a wall panel which is inexpensive to fabricate and which facilitates the incorporation of fire retardant and fire extinguishing devices or materials. Prior to the present invention, Naglowsky has taught in the U.S. Pat. No. 3,654,996 the use of ceiling panels with a sheet of meltable vinyl material confining a powder which will be released in the presence of a fire by melting of the meltable material to permit the powder to fall down from the ceiling panels to extinguish a fire. Such panels, however, require rigid frames, hence increasing the cost of the panel, and may be utilized with limited powders, such powders generally having a deleterious effect upon furnishings in a room in which the panel has released its powder. Further, the panels must be replaced once they have released their powder, even if the release is the result of elevated temperatures caused by other than fire. In addition, it is difficult to construct such panels in a decorative manner.

In accordance with the present invention, panels which may be used for ceiling panels are constructed in the form of an assembly of plastic balls which adhere together to provide a rigid, and inexpensive panel. Objects have been formed in the past utilizing a plurality of plastic balls, such as disclosed in U.S. Pat. No. 3,632,703 to Sullivan and U.S. Pat. No. 3,608,010 to Stayner, but objects formed in accordance with the teachings of these patents have required an adhesive between the balls to retain them in position. It is an object of the present invention to provide a process for producing solid objects utilizing a plurality of plastic balls which fuse together and require no resin or other material to cement or bond the balls one to another.

The processes of the prior art which utilize a plurality of balls of plastic to form a solid material, have incorporated balls of plastic material which were formed by molding, vacuum forming, or other conventional processes. It is an object of the present invention to provide a process and an apparatus for producing hollow balls of plastic material without the need for molding or vacuum forming, and which permits the use of these balls of plastic material immediately and directly, without cooling, in the formation of objects.

As will be described hereinafter, the present invention provides a method and an apparatus for producing balls of plastic material in which the balls are individually blown from molten plastic material into a hollow body, preferably of a spherical shape, the balls are removed from the mass of molten plastic and transported while maintaining a sufficient temperature to remain tacky to the point at which the object in question is to be assembled, and each tacky ball strikes and adheres to other balls within a mold at the point of assembly of the object to form upon cooling the desired object. A preferred form of object is a flat panel formed of a large number of such balls which self-adhere together and which is suitable for use as a ceiling panel. Such ceiling panels readily incorporate fire extinguishing devices within the mass of balls which will discharge when subjected to an elevated temperature, thus releasing a liquid or vapor for extinguishing or retarding a fire. The fire retardant liquid may be incorporated in a separate container disposed within the panel, or within plastic balls themselves which form the ceiling panel.

DESCRIPTION OF THE DRAWINGS

FIG. 5 is a view illustrating the apparatus and process for filling hollow plastic balls with fire retardant liquid in accordance with the teachings of the present invention and illustrating a modified panel construction;

FIG. 6 is a view of the panel of FIG. 5 and apparatus for filling exposed balls with fire extinguishing liquid;

FIG. 7 is a fragmentary sectional view of the completed ceiling pane illustrated in FIG. 6;

FIG. 8 is a sectional view illustrating the fire retarding liquid dispersing apparatus shown in FIG. 1;

SPECIFIC DESCRIPTION OF INVENTION

Figure 1:
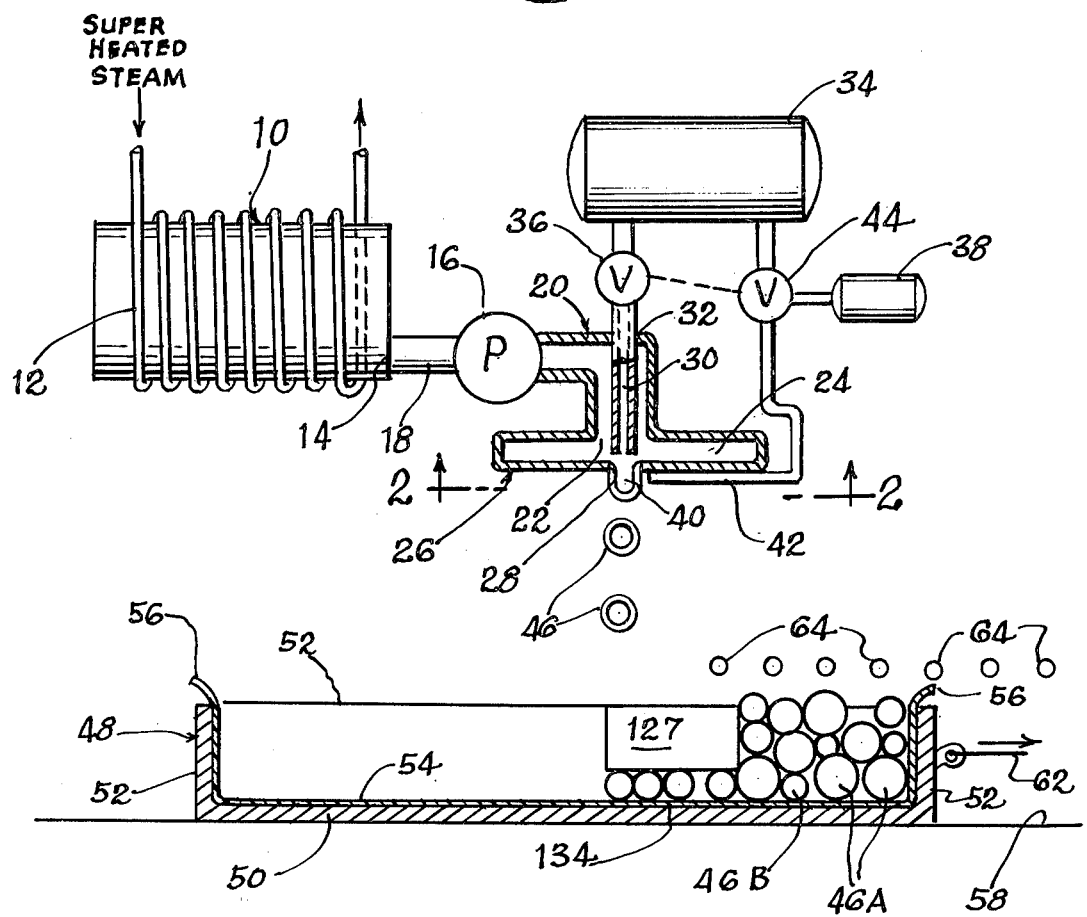
FIG. 1 is a partly diagrammatic view showing the apparatus for producing a ceiling wall panel and illustrating the process of producing a ceiling wall panel according to the present invention.

As illustrated in FIG. 1, a mass of plastic material is disposed within a vessel 10 and maintained in a flowable state by means of a heater. In FIG. 1, the heater is in the form of a coil 12 connected to a superheated steam source which maintains the temperature of the liquid plastic within the vessel 10. The vessel 10 has an outlet port 14 which is connected to a pump 16 by means of a tube 18. The outlet side of the pump 16 is connected to a tubular elbow 20 which terminates in a circular orifice 22. The orifice 22 communicates with a flat circular chamber 24 disposed within a housing 26. The chamber has an aperture 28 aligned and coaxial with the orifice 22.

A blow tube 30 extends through an opening 32 in the elbow 20 and terminates coaxially confronting the aperture 28 of the housing 26. The blow tube 30 is connected to a compressed air source 34 through a valve 36. The valve 36 is mechanically coupled to a motor 38 which forms a means for periodically opening the valve 36 in order to provide short blasts of air.

In operation, the pump 16 provides a relatively low pressure of flowable plastic to the entire region within the tubular elbow 20 and chamber 24 of the housing 26. Each time the motor 38 opens the valve 36, a short pulse or blast of air passes from the end of the blow tube through the aperture 28, thus forming a bulge of plastic about the small volume of air released by each opening of the valve 36. Each blast of air forms a plastic pocket, illustrated at 40 in FIG. 1, containing the air of that blast, but it is necessary to provide some means to cut off the pocket 40 in order to form a hollow sphere or ball.

Figure 2:
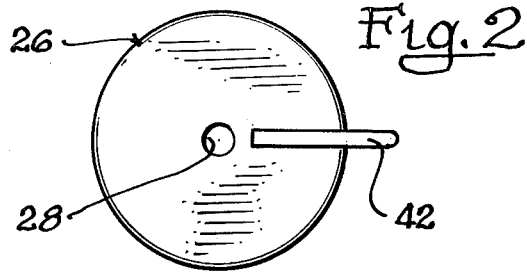
FIG. 2 is a plan view of the apparatus for producing balls of plastic material taken along the line 2—2 of FIG. 1.

FIGS. 1 and 2 illustrate a second blow tube 42 mounted on the outside of the housing 26 and opening in confrontation with the aperture 28 of the housing 26. The second blow tube 42 is connected to the compressed air source through a second valve 44, the second valve 44 also being mechanically coupled to the motor 38. Hence, the motor drives both the valve 36 and the valve 44 though successive cycles, but the valve 44 is timed to be opened for a short period of time immediately following the closing of the valve 36. As a result, the blast of air through the first blow tube 30 resulting from the opening of the valve 36 forms the pocket 40 before the motor 38 opens the valve 44, and the blast of air formed by opening the valve 44 severs the connection of the pocket 40 from the housing 26 and permits the hollow ball formed from the pocket 40 to be transported with respect to the housing 26.

In FIG. 1, two successive hollow balls are shown falling by gravity from the housing 26, these balls being designated 46. Other means also may be provided to transport the balls 46 to a desired location. Unless the balls 46 are subjected to a heated atmosphere, the plastic forming the balls 46 will cool, and thus harden.

FIG. 1 also illustrates the use of the ball forming apparatus to form a panel. A form 48 is employed to establish the shape of the panel, and in the particular illustration, the form 48 has a flat bottom 50 and walls 52 forming a rectangular frame secured and sealed to the bottom 50 and open at the top. The particular panel illustrated is to have a flat surface, and hence a flat sheet 54 of plastic material is laid on the bottom and the two opposite walls of the frame 48 to terminate in tabs 56. The balls 46 fall by the influence of gravity into the mold or form 48 first into abutment with the sheet 54 and then stack spheres or balls 46 are permitted to fall into the form 48 in a relatively cool region, thereby avoiding deformation of the spheres or balls, and that they are thereafter heated by the electrical heating elements 64 to form a unified sheet.

The plastic material used for the balls 46 and the flat sheet 54 may be any plastic which becomes tacky upon heating and will adhere to other bodies of the same plastic. Suitable plastics are polyethylene terephthalate, polyethylene polypropylene, polymaides, polytetrafluoroethylene, polyvinylchloride, polyvinylacetate, and Flamolin 853, a plastic produced by U.S. Industrial Chemical Company which has a melting point of approximately 160° F. at sea level, is fire retardant, the latter being preferred for its fire retardant properties. The temperature of the vessel 10 is adjusted to provide a flowable viscous plastic material, approximately 190° F. when using Flamolin 853, and the viscosity of the plastic determines within the operable range the thickness of the walls of the spheres or balls 46. The size of the balls 46 is determined by the quantity of air passing the valve 36 in each period the valve is opened, and the quantity of air is determined by the pressure of the compressed air source 34 and the period in which the motor 38 renders the valve 36 open. In the embodiment of FIGS. 1 and 2, the pocket 40 of plastic expands against the ambient atmosphere as a result of the blast of air from the blow tube 30, thereby forming a substantially spherical ball for each blast, as illustrated at 46.

Figure 3:
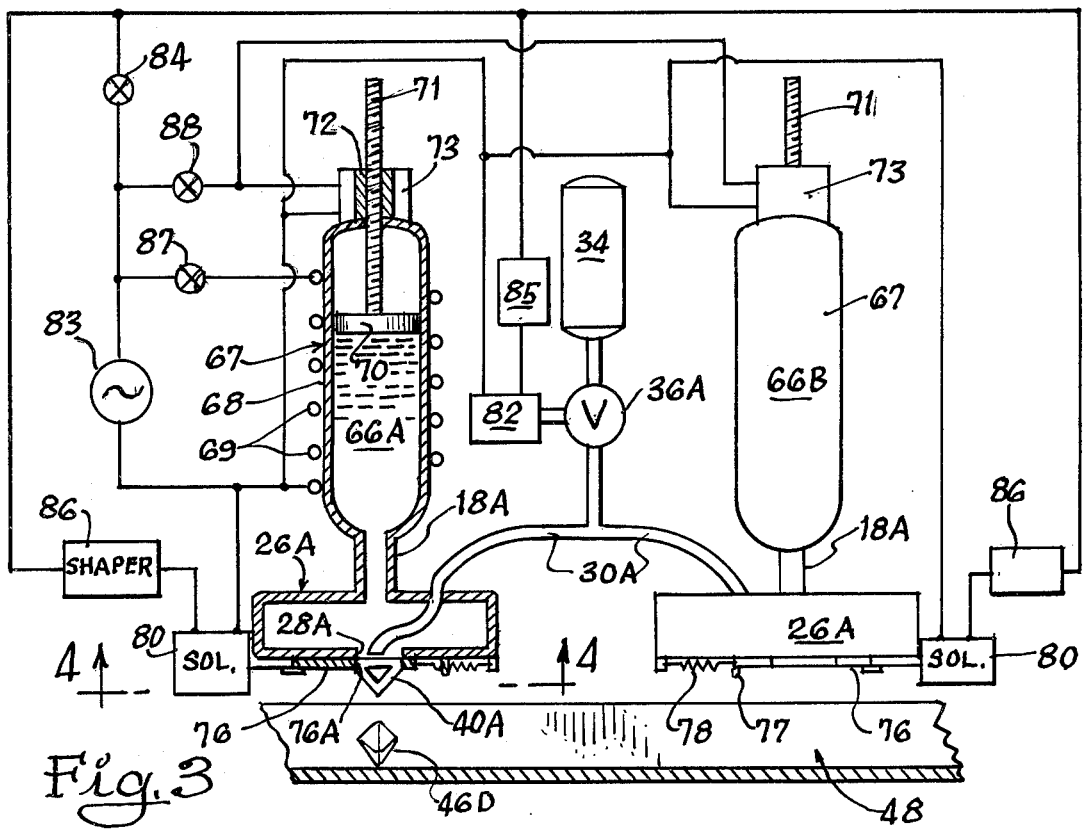
FIG. 3 is a partly diagrammatic view of another embodiment of apparatus for producing spherical balls of plastic according to the present invention.
Figure 4:
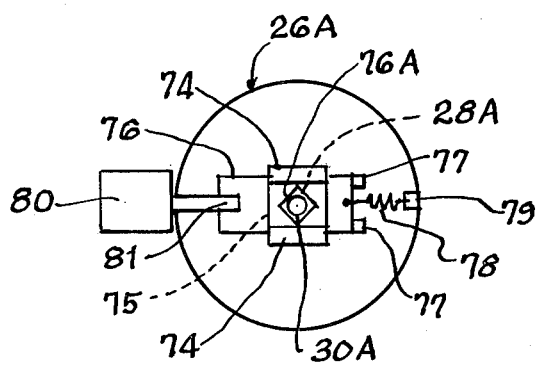
FIG. 4 is a plan view taken along the line 4—4 of FIG. 3.

FIGS. 3 and 4 illustrate another embodiment of the present invention. In this embodiment the form 48 is stationary, and the balls 46C are ejected from a plurality of separate machines mounted above and confronting the form 48. FIG. 3 illustrates two such machines designated 66A and 66B. Each of the machines includes an extruder 67 which is connected to a housing 26A through a tube 18A, although a single extruder may be used for a plurality of machines. The housing 26A and tube 18A correspond to the housing 26 and tube 18 of the embodiment of FIGS. 1 and 2. The extruder 67 may be any conventional extruder, and as illustrated has a cylindrical vessel 68 which is electrically heated by a coil 69 disposed on the exterior surface of the vessel 68. A piston 70 is slightably disposed within the vessel 68 and driven through an exteriorly threaded piston rod 71, the rod 71 is engaged by a threaded nut 72 which is mounted coaxially within the rotor of an electrical motor 73 and driven thereby.

The housing 26A has a square aperture 28A on its side opposite the tube 18A. A blow tube 30A confronts centrally the square aperture 28A. The interior of the housing 26A and the portion of the vessel 68 from the piston to the housing 26A are filled with molten plastic placed under pressure by the piston 70. As in the embodiment of FIGS. 1 and 2 the plastic is forced through the aperture 28A as a result of the pressure on the plastic and a pocket of plastic is formed about the rectangular aperture 28A due to a blast of air through the blow tube 30A, the pocket being designated 40A in FIG. 3. The pocket 40A, however, differs from the pocket 40 of FIGS. 1 and 2 in that the pocket is substantially in the form of a portion of a polyhedron as will be described hereinafter.

A pair of parallel elongated guide frames 74 are mounted on the housing 26A on opposite sides of the aperture parallel to the diagonal axis of the aperture 28A. The frames 74 each have a slot 75 extending therein and confronting each other, and a translatable plate 76 with an opening 76A is disposed within the slot 75. One end of the plate is urged against a stop formed by two posts 77 by means of a spring 78 anchored at its end opposite the plate on a ring 79 protruding from the housing 26A. The opposite end of the plate 76 from the spring 78 is mounted on a solenoid 80 by means of a pin 81. The opening 76A in the plate has a rectangular shape corresponding to the aperture 28A, and is coincident with the aperture 28A when the plate 76 is spaced from the stop posts 77 by a distance slightly greater than the diagonal axis of the aperture 28A.

As illustrated in FIG. 3 both machines 66A and 66B are identical in construction, and the blow tubes 30A of both machines are connected through a T-connection and a valve 36A to a compressed air source 34. The valve 36A is actuated by a solenoid 82 which is connected to a source of alternating current 83 through an electrical switch 84. A timer 85 connected between the switch 84 and the solenoid 82 limits the period in which the solenoid 82 is activated on each closing of the switch 84 to thereby limit the period in which the valve 36A is open and the duration of the air blast used to form the pocket 40A.

Both solenoids 80 of the machine 66A and 66B are connected across the alternating current source 83 through the switch 84 and an electrical wave shaping circuit which rectifies the alternating current pulse from the switch 84 and produces a rising potential saw tooth pulse responsive to each closing of the switch 84.

The saw tooth pulse is applied to the solenoid 80 to gradually increase the force exerted on the plate 76 and against the spring 78 during the period of the saw tooth pulse, thus increasing the displacement of the plate 76 during this period from the posts 77.

Figure 4A:
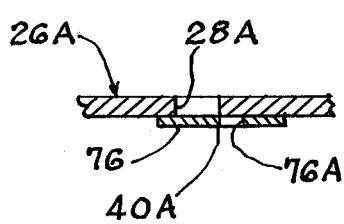
FIGS. 4A, 4B and 4C are somewhat diagrammatic views of the machine of FIGS. 3 and 4 showing the foundation of a polyhedron.
Figure 4B:
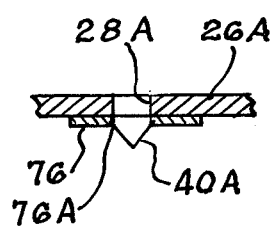
Figure 4C:
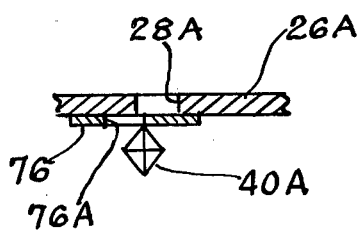

FIGS. 4A, 4B and 4C illustrate the progression of the plate 76 during each cycle. In FIG. 4A, the plate 76 has been translated (to the left) a sufficient distance to start formation of the pocket 40A. In FIG. 4B the plate 76 has been translated to align the aperture 28A in the housing and the opening 76A in the plate 76 to form the large central portion of the pocket 40A. FIG. 4C shows the plate 76 translated further to the left and about to complete the polyhedron pocket 40A and snip it from the housing 26A.

In the embodiment of FIGS. 3 and 4 the plastic in the vessel 68 is maintained molten by means of the electrical coils 69 which is connected to the alternating current source 83 through a switch 87. Also, the motor 73 which advances the piston 70 to place the plastic under pressure is connected across the alternating current source 83 through a separate switch 88. The switch 88 controls both motor 73 and is effective to selectively control the pressure on the plastic within the housings 26A of both machines 66A and 66B.

The form 68 and both machines 66A and 66B are maintained in an ambient atmosphere sufficiently elevated so that the balls 46D remain sticky and will adhere together within the form 48 without further heating or the use of resin.

The frame 48 is illustrated fragmentarily in FIG. 3 and may be of any desired size. Further, enough ball forming machines 66 may be positioned over the frame to require no further or additional movement of the frame in order to totally fill it with balls 46D, or the machines 66A and 66B may be movable with respect to the frame 48 to distribute the balls.

FIG. 5 illustrates a fragment of a wall panel having a plurality of balls 46 formed by the apparatus of FIGS. 1 and 2, although the apparatus of FIGS. 3 and 4 could also be utilized to produce a panel of balls 46C. It will be noted that all of the balls 46 tend to be of the same size, but the balls can be varied in size by varying the compressed air from the source 34. It will be noted that in FIG. 1, the fragmentary panel there illustrated utilizes a plurality of large balls 46A and a plurality of small balls 46B. The small balls 46B may be obtained by shortening the period in which the valve 36 is opened or a proportion of the cycles, such as every other cycle which will produce equal numbers of large balls 46A and small balls 46B. In the embodiment of FIG. 5, all of the balls 46 are of the same diameter.

It will also be noted that the panel illustrated in FIG. 5 does not utilize the flat sheet 54, but permits the lower course of balls designated 46C to be exposed and on a common plane. Each of these balls in the lower course 46C are illustrated to contain a mass of liquid 114 which is a fire retardant liquid such as Trichlorotrifluoroethane, a product of E. I. DuPont, which will vaporize and tend to extinguish a fire. The fire retardant liquid should tend to extinguish a fire, produce no damage to structure or furnishings, be non toxic, not require clear clean up after release, and release at relatively low temperature, as does Trichlorotrifluoroethane. It will be noted that the mass 114 of liquid fire extinguisher only partially fills the lower course 46C of balls, the remainder being air. When a panel constructed in the manner of FIG. 5 is installed as a ceiling panel with the lower course 46 facing downwardly, the panel is effective to extinguish fires within that enclosure in response to an increase in temperature of the enclosure. The rise in temperature increases the pressure within the lower course 46C of balls, both as a result of an increase in the temperature of the air within these balls and as a result of vaporization of the fire retardant liquid. At the same time, the plastic walls of the balls of the lower course 46C softens, and the balls will rupture releasing the liquid mass 114 and the vapor thereof.

FIG. 6 illustrates a modified form of panel and the process for impregnating the lower course 46C of balls with fire retardant liquid. In the embodiment of FIG. 6, the balls of the lower course 46C are positioned upwardly to facilitate filling the balls with fire retardant and extinguishing liquid. Further, the balls are secured together by a resin mass 116, rather than self adhering together as in the panel of FIG. 5. The panel of FIG. 6 is thus formed without utilizing the heating element 64, but pouring into the form 48 resin to form the mass 116.

The balls 46C of the lower course are impregnated with the fire extinguishing fluid by means of hollow needles 118 which depend from a vessel 120. Since the balls of the lower course 46C are substantially equally spaced, the vessel is provided with a plurality of needles 118 which pierce a plurality of balls simultaneously. The vessel 120 contains a mass of the fire extinguishing fluid 114, and is also coupled to a compressed air source 122 through a valve 124, thereby pressurizing the vessel 120 to force the fire extinguishing liquid 114 into the course 46C of balls. After the balls of the lower course 46C are filled approximately three-fourths with the fire extinguishing liquid 114, the needles 118 are removed and the openings in the balls of the lower course 46C are closed by applying plastic cement to the openings, the cement being indicated at 126 in FIG. 7 which illustrates the same fragment of the panel as FIG. 6 in completed form.

One of the advantages of the process illustrated in FIGS. 1 and 3 for producing hollow spherical balls of plastic material is that it facilitates imbedding objects within the panel. In FIG. 1, a separate fire extinguisher 127 is illustrated in position during the process of formation of the panel. The fire extinguisher 127 is shown in greater detail in FIG. 8 and utilizes a container 128 which has depending therefrom a fuse housing 130. The fuse housing terminates in a spherical disc 132 of material which softens readily in response to a rise in temperature to the order of 135° F. to 165° F., and the disc 132 must be exposed to the atmosphere of the room which is to be protected by the fire extinguisher.

In the panel shown in formation in FIG. 1, the flat sheet 54 is to confront the room, the panel being a ceiling panel. Immediately confronting the fuse 132 of the fire extinguisher 127, there is provided an opening 134 in the flat sheet 54 to permit the fuse 132 to be subject to the temperatures of the room. The fire extinguisher 127 is held in position by the hollow spheres or balls 46 which are packed around the fire extinguisher, except for the upper surface. If the ceiling panel is constructed utilizing resins, as illustrated at 116 in FIGS. 6 and 7, the fully assembled fire extinguisher 127 may be imbedded within the panel, since the panel will not be subjected to heat by the heating elements 64. However, if the heating elements 64 are utilized to cause the hollow balls to adhere to each, then it is necessary to assemble the fuse after completion of the panel in order to prevent premature firing of the fuse during the process of applying heat to cause the balls to adhere to each other.

The fuse structure shown in the fire extinguisher 127 in detail in FIG. 8 consists of a hollow pin 136, the disc 132 and a spring 138. The pin 136 has a head 140 secured on the disc 132. The end of the pin 136 opposite the head 140 is cut diagonally to form a point 142 confronting the lower side of the container 128. The spring 138 is disposed about the pin 136 with one end abutting the head 140. The end of the spring 138 opposite the head 140 is securely mounted within a loop 144 protruding inwardly from the housing 130. The spring 138 is anchored at one end on the head 140 and placed under tension by means of the loop 144 at the other end, thereby urging the pin 136 toward the container 128. The fuse may be placed in position by rotating the disc 132 against the fuse housing 130 to cause the spring 138 to engage the loop 144, thereby tightening the spring. When the fire extinguisher 127 is subjected to a sufficiently high temperature to soften the disc 132, in one particular construction 135° F, the disc releases the head 140 of the pin, thus permitting the spring 138 to drive the point 142 into the container 128, thus releasing the liquid fire extinguishing material from the container. The fire extinguishing material flows down the hollow pin 136 and exits through one or more apertures, such as the aperture 146 which extends through the head 140 of the pin 136. In the embodiment described, the fire extinguishing material becomes vapor at temperatures above 117° F and flows through the apertures as vapor.

Figure 9:
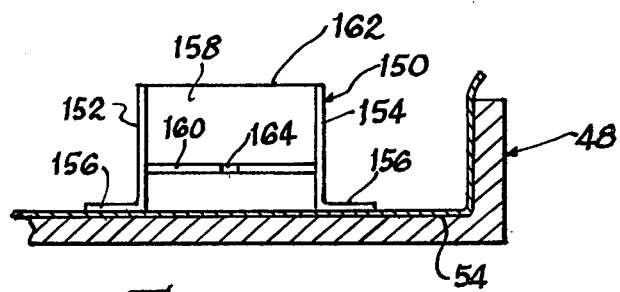
FIG. 9 is a fragmentary view of the form of FIG. 1 and a saddle for removably mounting the fire extinguisher of FIG. 7.

FIG. 9 shows a saddle 150 mounted on the form 48 of FIG. 1 and in position to receive balls 46 from the ball making machine 26 of FIG. 1. The saddle 150 has the function of providing a support which may be embedded directly in the panel and which will removably mount the fire extinguisher 127 of FIG. 8.

The saddle 150 has sidewalls 152 and 154 which are provided with outwardly extending flanges 156. The flanges 156 rest upon the surface of the linear 54 in the form 48, and the balls 46 which are packed within the form 48 will abut against the flanges 156 and the walls 152 and 154 of the saddle 150 to secure it in place to the panel. The saddle 150 has end walls 158 and a bottom 160 to form a rectangular container open at the top 162. The bottom 160 is provided with an aperture 164 which yieldably accommodates a protruding nub 166 located centrally of the surface of the container 128 of the fire extinguisher 127. The saddle 150 is proportioned to accommodate the container 128 of the fire extinguisher and to position the protruding nub 166 in the aperture 164. The nub 166 is constructed of compliant material and may be forced through the smaller aperture 164 to secure the fire extinguisher 127 on the saddle 150. The fuse housing 130 of the fire extinguisher 127 protrudes outwardly from the walls 152, 154 and 158, and may be utilized as a handle for removal of the fire extinguisher 127.

Figure 10:
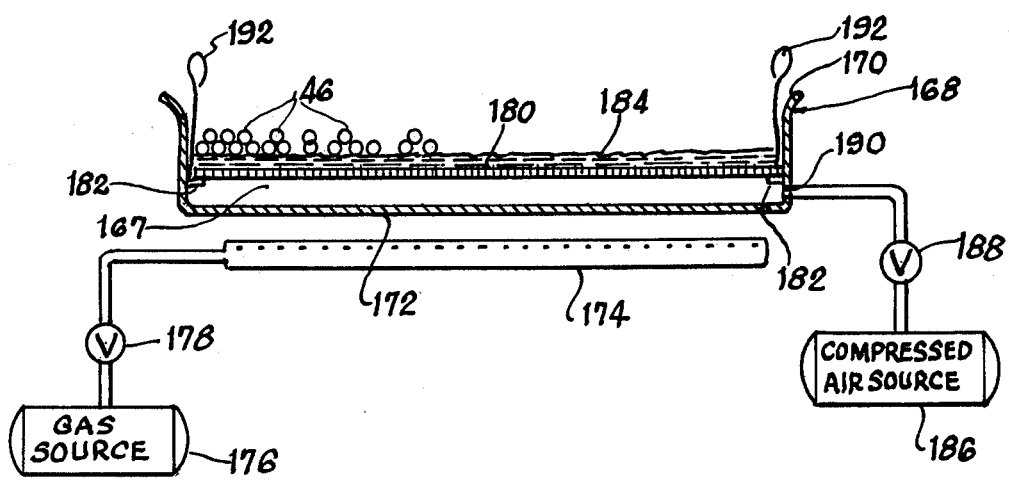
FIG. 10 is a sectional view, partly diagrammatic, of another embodiment of the present invention.

FIG. 10 illustrates another embodiment of the present invention for producing a flat sheet of plastic bubbles. In the embodiment of FIG. 10, a quantity of plastic in liquid form forms a body 166 within a large flat container 168 open at the top 170. The container 168 has a flat bottom 172 and is constructed of thermally conducting material, and a heat source illustrated as a burner 174 is disposed under the bottom 172 and provided with a source of heating gas 176 through a valve 178.

A thin flat porous sheet 180 is disposed within the vessel 166 parallel to the bottom 172. The porous sheet 180 is mounted on pins 182 extending inwardly from the vessel 168 to maintain the porous sheet 180 spaced from the bottom 172 of the vessel 168. The level of the body 166 is indicated at 184 and is above the sheet 180.

A source of compressed air 186 is connected through a valve 188 to a port 190 located in the vessel between the porous sheet 180 at the bottom 182. The sheet 180 may be constructed of fiberboard and provided with perforations, or may be a perforated metal sheet. It may also be a fiber construction which is porous to the passage of air.

A panel is formed by maintaining the body 166 of plastic material in a molten condition, as a result of flame heating of the bottom 172 by gas from the gas source flowing through the gas valve 178. Bubbles are formed above the porous sheet 180 by means of air introduced through the port 190 from the compressed air source 186 and regulated by the valve 188. Bubbles of plastic material will form above the sheet 180, and when substantially all of the plastic material above the sheet 180 is converted into bubbles, the valve 178 from the gas source 176 is closed, thus extinguishing the flame from the burner 174, and permitting the molten plastic within the vessel 168 to cool. When the bubbles, indicated at 46 in FIG. 10, are relatively firm as a result of cooling, the panel 180 is removed from the vessel 168, the plastic body 166 between the panel 180 and 182 being in a somewhat molten condition to permit removal of the panel 180 and bubbles 46 located above the panel. This may be accomplished by wire hangers 192 attached to the ends of the panel 180. The panel 180 and associated bubbles or balls 46 of plastic are permitted to harden into a flat sheet which may be utilized for building construction.

Panels constructed according to the present invention may have balls or spheres which are relatively large, such as one and one-half inches in diameter, thus trapping a relatively large quantity of air within the balls and providing excellent thermal insulation. Further, panels constructed according to the present invention readily permit the use of fire extinguishing liquids, either incorporated in the panel balls themselves, or in separate extinguishers imbedded in the panels. Hence, a ceiling panel constructed in the manner here set forth, will not only extinguish a fire within an enclosure, but also will protect adjacent areas of a building from the intense heat generated by the fire due to the thermal insulation of the enclosure until the balls themselves soften in an extreme fire.

Panels may be constructed of virtually any thickness in accordance with the process of the present invention. Panels may also be made decorative, such as by the use of two or more colors of plastic in a single panel utilizing two or more ball forming machines. As indicated above, the monotony of a single size ball may be overcome by the use of different size balls generated by the same ball forming maching or separate ball forming machines.

Those skilled in the art will devise many uses and applications for the present invention beyond those here specifically set forth. It is therefore intended that the scope of the present invention be limited not by the foregoing disclosure, but only by the appended claims.

The invention claimed is:

1. A panel for use in building construction comprising a plurality of hollow balls having a thickness at least equal to a multiple of the average cross section of the hollow balls, each ball abutting a plurality of other balls of the panel and adhering thereto to form a self supporting structure, each of said balls having a substantially symmetrical exterior surface and a portion of all of the balls on at least one surface of said panel extending to a common contour, said balls being constructed of plastic which softens responsive to temperatures above a threshold value, at least a portion of the balls on said one surface of the panel containing a fire retardant liquid which vaporizes at temperatures above the threshold value, whereby subjecting the panel to temperatures above the threshold value softens the plastic of the balls and vaporizes the fire retardant liquid to cause the balls containing the fire retardant liquid to rupture and release vapor of the fire retardant liquid.

2. A panel for use in building construction comprising the combination of claim 1 wherein the threshold value of the temperature at which the plastic of the balls softens is no greater than 190° F., and the fire retardant liquid varporizes at a temperature below 150° F.

3. A panel for use in building construction comprising the combination of claim 1 wherein said one surface is flat.

4. A panel for use in building construction comprising the combination of claim 1 wherein the hollow plastic balls are substantially spherical.

5. A panel for use in building construction comprising the combination of claim 1 wherein each of the hollow plastic balls is a polyhedron.

6. A panel for use in building construction comprising the combination of claim 1 wherein each ball is fused on each of the balls to which it abuts.

* * * * *